Figure 1:
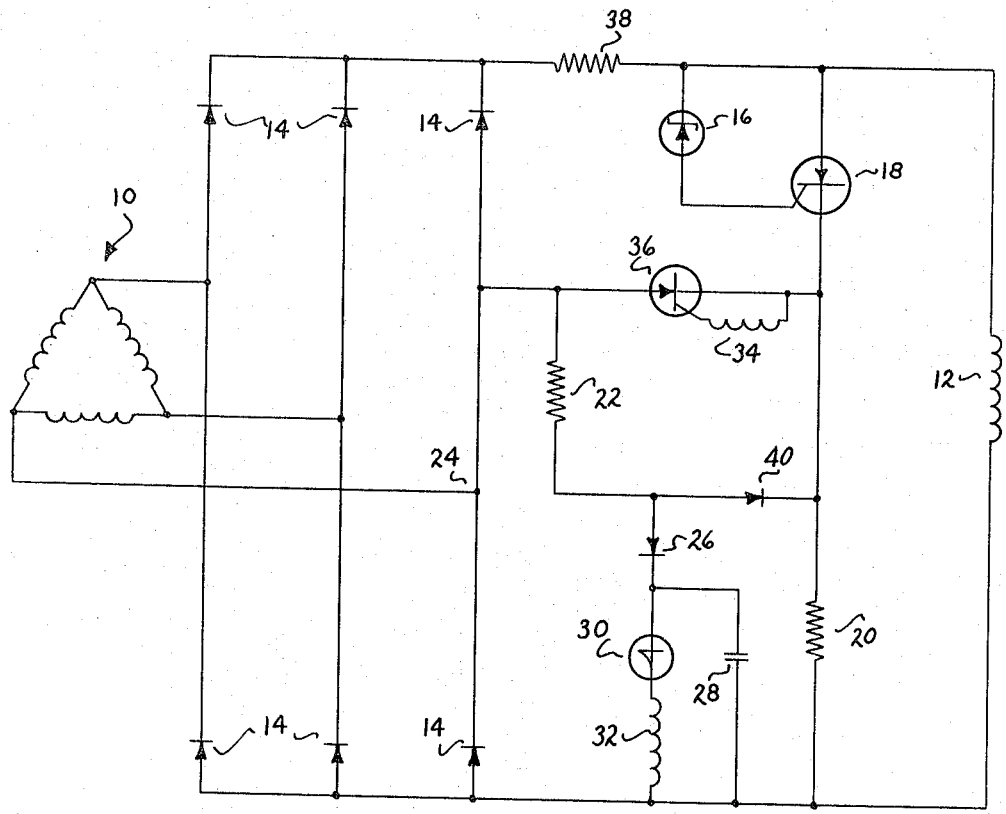

April 11, 1967  J. J. BROCKMAN  3,314,001
EXCITATION SYSTEM FOR A SYNCHRONOUS GENERATOR
Filed Nov. 14, 1963  2 Sheets-Sheet 1

INVENTOR.
JOHN J. BROCKMAN
BY
*James R Campbell*
HIS ATTORNEY

INVENTOR.
JOHN J. BROCKMAN

United States Patent Office 3,314,001
Patented Apr. 11, 1967

3,314,001
EXCITATION SYSTEM FOR A SYNCHRONOUS GENERATOR
John J. Brockman, Schenectady, N.Y., assignor to General Electric Company, a corporation of New York
Filed Nov. 14, 1963, Ser. No. 323,773
5 Claims. (Cl. 322—73)

The invention described herein relates to an excitation system for a synchronous generator and more particularly to a circuit arrangement for controlling the insertion of a discharge resistor in the generator field circuit.

In the design of brushless synchronous motors and generators, the exciter output winding is mounted on the same shaft as the motor or generator field winding and rectifiers are inserted therebetween for providing the direct current necessary to establish the magnetic field in the motor or generator. Under some conditions of operation, reverse voltage generated in the field winding is applied to the rectifiers and in those instances where the voltage is excessively high, destruction of the rectifiers may result. The Rosenberry Patent 3,098,959, assigned to the same assignee as the present invention, discloses an arrangement for protecting the exciter rectifiers and for controlling the insertion and removal of a discharge resistor in the motor field circuit. As disclosed, a pair of series connected silicon controlled rectifiers are connected in the discharge resistor-field winding circuit and to one phase of the exciter, the arrangement being such that the controlled rectifiers short the field winding resistor when the induced voltages are too high, and after the transient condition dissipates itself, reconverts the controlled rectifiers to a non-conducting state.

The disadvantages of this arrangement are that the controlled rectifiers must have a rating sufficient to carry the field winding current in addition to the current flowing in the circuit from the exciter. Moreover, two controlled rectifiers must be used for controlling the insertion of the field discharge resistor in the circuit. The costs therefore are relatively high because of the number and large sizes needed when considered as a proportion of the complete control system costs. Also, since the rectifiers are of large physical size, difficulties sometimes are encountered in getting them mounted on the rotor shaft.

In another arrangement disclosed in the Brockman and Goss patent application Ser. No. 288,426, filed June 17, 1963, and assigned to the same assignee as the present invention, a different method is used for controlling operation of the controlled rectifiers used in shorting the discharge resistor during asynchronous operation. In that design, parallel connected controlled rectifiers are arranged so that one provides a path for current flow to the resistor, while the other is used for causing the first rectifier to become non-conducting after the transient condition is dissipated. The major disadvantage with this arrangement is the capacitor is of large size and again presents the problem of mounting it on the shaft. Both material and labor costs for locating it on the shaft are considered undesirable factors.

In view of the disadvantages inherent in those prior art circuit arrangements, it is apparent the need exists for a more simple circuit design preferably having less parts and of smaller size for controlling the insertion and removal of a discharge resistor in a field winding circuit.

In carrying out my invention, I satisfy this identified need by providing a first circuit which responds to the induced voltage and inserts a discharge resistor in series with the field winding. A second circuit connected between the exciter and the resistor senses the voltage across the resistor and conducts exciter current thereto when the transient condition dissipates itself. Since the second circuit has less voltage drop than the first circuit, the latter is converted to a non-conducting state thus isolating the resistor from the field winding. As the exciter terminal to which the second circuit is connected swings negative, the second circuit becomes non-conducting, thereby preparing the circuitry for repeated operation.

Figure 2:
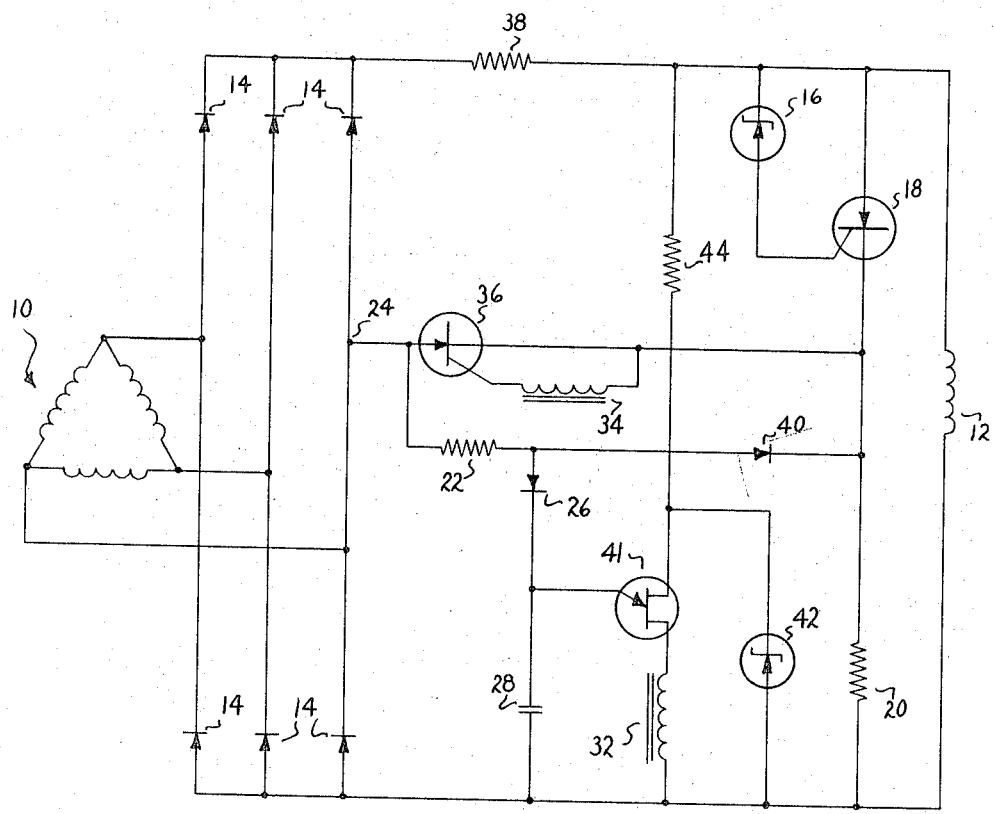

While the specification concludes with claims particularly pointing out and distinctly claiming the subject matter which I regard as my invention, it is believed the invention will be better understood from the following description taken in connection with the accompanying drawings in which:

FIGURE 1 illustrates a circuit arrangement for controlling the insertion and removal of a discharge resistor in the field circuit of a synchronous generator; and FIGURE 2 is a modification of FIGURE 1.

Referring now to the drawings wherein like reference characters designate like or corresponding parts throughout the several views, there is shown an excitation system for a brushless synchronous generator of the type having an exciter output winding 10 mounted on the same shaft as the field winding 12 for a generator. As in conventional designs, the three-phase alternating current output is converted to a unidirectional state by rectifiers 14 mounted on the shaft and connected between the exciter armature and generator field windings.

Under certain conditions of operation, such as that encountered when attempt is made to synchronize out of phase or when the armature circuit is opened after a prolonged short circuit which causes the field current to flow in reverse, or when the synchronous generator loses synchronism with a system to which it can be connected, an inverse voltage is induced in the synchronous generator field circuit and sometimes reaches magnitudes sufficient to destroy the exciter rectifiers 14. To protect these rectifiers a discharge resistor is connected in series with the generator field winding for absorbing the induced power. To accomplish this, a zener diode 16 is connected in the generator field circuit and to a gate of a silicon controlled rectifier 18. When the induced voltages reach the avalanche voltage chosen for the diode, it conducts and supplies current to the gated lead on the controlled rectifier and converts it to a conducting state. When the lower terminal of the field winding is positive, current flows through the exciter rectifiers 14 in a closed circuit with the field winding, and when the other terminal becomes positive, current flows through the conducting controlled rectifier 18 and the field discharge resistor 20.

When the transient condition which causes production of the excessive induced voltages disappears, the controlled rectifier 18 normally would be kept in a conducting state by current from the exciter. To avoid continuous exciter power loss in the resistor because the controlled rectifier is still in a conducting state and to avoid exciter voltage drop imposed by this additional load, the controlled rectifier must be made non-conducting when the induced voltage disappears.

To accomplish this, a supplemental circuit is employed for by-passing rectifier 18 and rendering it non-conductive. The circuit consists of a resistor 22 having one end connected to a terminal 24 extending to one of the phases in the exciter winding. The other end is connected to diode 26 which is in circuit with a capacitor 28 and a four-layer diode 30 and the primary of a transformer 32. During the time the controlled rectifier 18 is furnishing a conducting path for induced current flowing to the resistor 20, the phase of the exciter winding connected to terminal 24 will swing positive and charge capacitor 28 through resistor 22 and diode 26. When the capacitor 28 is charged to the firing voltage of the four-layer diode 30, it discharges to the pulse transformer 32. The pulse thus induced in the transformer secondary 34 provides gate current to the controlled rectifier 36 and converts it to a conducting state.

It will be noted that the capacitor 28 becomes charged only when the voltage from the exciter through terminal 24 is positive. When the exciter voltage goes negative, the capacitor retains whatever charge is on it. The turn on pulse for the diode 30 is therefore synchronized with the voltage at terminal 24.

If the transient condition has reduced to the point where the induced voltage falls below the output voltage of the exciter, the controlled rectifier 36 conducts current from the exciter to the discharge resistor 20 when the terminal 24 phase is positive. When this occurs, the controlled rectifier 18 becomes non-conducting because the voltage drop across resistor 38, diode 14, and the controlled rectifier 18, exceeds that through the single rectifier 36. The controlled rectifier 36 thereafter turns off when current from the exciter phase connected to terminal 24 goes negative, thus preparing the circuit for the next cycle of induced voltage.

It will be noted that capacitor 28 will not charge significantly, if at all, when controlled rectifier 18 is not conducting because only a relatively low magnitude current will flow from the exciter through the resistor 22 and diode 40 to the discharge resistor 20.

It will be apparent that a number of different types of circuit arrangements may be used for sensing the voltage across discharge resistor 20. In a different embodiment, this part of the circuit takes the form of the circuit in FIGURE 2. As shown, the four layer diode 30 of FIGURE 1 is replaced by a unijunction transistor 41, a zener diode 42 and resistor 44 connected in series with the zener diode. The zener diode and resistor serve to hold a voltage of predetermined value on transistor 40. The capacitor 28 is charged through resistor 22 and diode 26 and when the capacitor voltage exceeds the standoff ratio times the interbase voltage of the transistor 40, it becomes conducting and delivers a pulse to transformer primary 32. This action turns on rectifier 36 permitting rectifier 18 to again block exciter voltage. Rectifier 36 becomes non-conducting when terminal 24 goes negative.

In view of the above, it will be apparent that many modifications and variations will occur to those skilled in the art. It therefore is to be understood that within the scope of the appended claims the invention may be practiced other than as specifically described.

What I claim as new and desire to secure by Letters Patent of the United States is:

1. An excitation system for a synchronous generator comprising:
   an A.C. exciter having an armature winding and rectifiers connecting its armature winding to a generator field winding for furnishing excitation power thereto,
   a first switch and a discharge resistor connected in parallel with the exciter and with the generator field winding,
   said switch having characteristics such that it becomes conductive when the induced voltages in the field winding reach a predetermined maximum,
   detecting means connected to and responsive to the voltage across the resistor and including components for sensing when the exciter voltage persists across the resistor, and
   a second switch coupled to said detecting means and connected to said armature winding and the discharge resistor in parallel with the first switch and one of said rectifiers, said second switch being actuated to conduction by the detecting means, when the latter senses exciter voltage across the discharge resistor, to conduct exciter current to the resistor and by-pass the first switch to render the latter non-conducting.

2. An excitation system for a synchronous generator comprising:
   an A.C. exciter having an armature winding and rectifiers connecting its armature winding to a generator field winding for furnishing excitation power thereto,
   a first switch and a discharge resistor connected in series together and in parallel with the exciter and with the generator field winding,
   said switch including components rendering it conductive when the induced voltage in the field winding reaches a predetermined maximum so that when one terminal of the generator field winding is positive, the induced current flows through the exciter rectifiers and when the other terminal is positive, the first switch conducts current to the discharge resistor for shorting the generator field winding and limiting the voltage to a safe value for protecting the exciter rectifiers,
   detecting means connected to said resistor,
   a second switch coupled to and actuatable by said means, said second switch being connected to said armature winding and the discharge resistor in parallel with the path including said first switch to provide a conducting path from said exciter armature winding to the discharge resistor when said means determines that exciter current persists in the resistor,
   said means and said second switch being effective in by-passing exciter current around said first switch to the resistor and thereby rendering the first switch non-conductive when the transient condition establishing the induced voltages is dissipated, and
   said second switch being converted to a non-conducting state when the exciter terminal voltage becomes negative.

3. An excitation system for a synchronous generator comprising:
   an A.C. exciter having rectifiers connecting its armature winding to a generator field winding for furnishing excitation power thereto,
   a first switch and a discharge resistor connected in parallel with the exciter rectifiers and the generator field winding,
   means associated with the first switch selectively rendering it conductive when induced voltages in the field winding reach a predetermined value for applying said voltages across the resistor and for protecting the rectifiers when a transient condition exists which causes production of the induced voltages,
   a circuit connected between a terminal of the exciter armature winding and the resistor,
   a capacitor in said circuit capable of being charged to a predetermined value when the voltage of the exciter exceeds the voltage across the resistor,
   means connected with said capacitor and associated with a second switch for rendering the latter conductive when the exciter voltage appears across the resistor-field winding circuit, the arrangement being such that the second switch conducts exciter current to the resistor thus by-passing the first switch and rendering the latter non-conductive, and
   said second switch becoming non-conductive when the exciter terminal voltage goes negative.

4. An excitation system for a synchronous generator comprising:
   an A.C. exciter having rectifiers connecting its armature winding to a generator field winding for furnishing excitation power thereto,
   a silicon controlled rectifier and a discharge resistor connected in parallel with the exciter rectifiers and the generator field winding,
   an activating device responsive to the induced field voltage in the field winding and having a conducting voltage set at a predetermined value such that when the induced voltage reaches a certain value, the activating device energizes the controlled rectifier and makes it conducting thereby short circuiting the generator field winding through the resistor during one-half cycle of induced voltage and during the other half-cycle permitting the induced current to flow through the exciter rectifiers, a circuit connected between the exciter armature winding and the discharge resistor, said circuit including a capacitor connected in parallel with a sensing device and a pulsing element, the values for these components being selected such that when the exciter current flows through the discharge resistor, the capacitor will charge to a level set by the sensing device and when the firing voltage for the sensing device reaches a predetermined value, the capacitor discharges therethrough for energizing the pulsing element, and a second silicon controlled rectifier connected between a terminal of the exciter and the discharge resistor, said second rectifier having a device associated therewith which is responsive to the pulsing element so that when the pulse is delivered through the device, the second rectifier is converted to a conducting state and conducts current from the exciter to the resistor thus by-passing the first controlled rectifier and rendering it non-conductive, and said second controlled rectifier being converted to a non-conducting state when the exciter terminal to which it is connected becomes negative.

5. The combination according to claim 4 wherein said circuit includes a conducting device connected between the exciter armature winding and the discharge resistor and in parallel with the second controlled rectifier for conducting current from the exciter to the discharge resistor when the exciter current flows in the discharge resistor-field winding circuit and when the second controlled rectifier is in a non-conducting state.

References Cited by the Examiner

UNITED STATES PATENTS 3,100,279 8/1963 Rohner _____ 318—167
3,213,349 10/1965 Gutzwiller _____ 323—22 X MILTON O. HIRSHFIELD, *Primary Examiner.*

J. J. SWARTZ, *Assistant Examiner.*